(12) United States Patent
Hoag et al.

(10) Patent No.: US 7,357,343 B2
(45) Date of Patent: Apr. 15, 2008

(54) FISH STRIKE INDICATORS

(75) Inventors: Rick Hoag, 14745 Caminito Orense Este., San Diego, CA (US) 92129; Randy Hoag, San Diego, CA (US)

(73) Assignee: Rick Hoag, San Diego, CA (US)

( * ) Notice: Subject to any disclaimer, the term of this patent is extended or adjusted under 35 U.S.C. 154(b) by 0 days.

(21) Appl. No.: 11/463,511

(22) Filed: Aug. 9, 2006

(65) Prior Publication Data

US 2008/0035775 A1   Feb. 14, 2008

(51) Int. Cl.
*A01K 89/01* (2006.01)

(52) U.S. Cl. .................. 242/223; 242/323; 43/16; 43/17

(58) Field of Classification Search .............. 242/223, 242/224, 323; 43/17, 16, 4.5, 44.95, 24
See application file for complete search history.

(56) References Cited

U.S. PATENT DOCUMENTS

| | | | |
|---|---|---|---|
| 4,541,195 A * | 9/1985 | Delaney | 43/17 |
| 4,930,243 A * | 6/1990 | Lowe et al. | 43/17 |
| 5,125,181 A * | 6/1992 | Brinton | 43/17 |
| 5,182,873 A | 2/1993 | Aragon, Jr. | |
| 5,495,688 A * | 3/1996 | Sondej et al. | 43/16 |
| 5,570,532 A | 11/1996 | Shaffer et al. | |
| 5,829,181 A * | 11/1998 | Fielder et al. | 43/17 |
| 6,253,483 B1 | 7/2001 | Reams | |
| 6,708,441 B2 | 3/2004 | Dirito | |
| 6,966,140 B1 | 11/2005 | Rozkowski | |
| 7,008,086 B1 * | 3/2006 | Kell | 362/431 |

FOREIGN PATENT DOCUMENTS

GB    2248161 A  *  1/1992

OTHER PUBLICATIONS

Great Lakes Sports Fishing Council "Product Review", Apr. 29, 2002. http://www.great-lakes.org/review-04-29-02.html.

* cited by examiner

*Primary Examiner*—Emmanuel M Marcelo
(74) *Attorney, Agent, or Firm*—Baumgartner Patent Law; Marc Baumgartner

(57) ABSTRACT

Fish strike indicators are disclosed herein. Fish strike indicators can include a fishing reel having a rotatable fishing line spool and housing a power source operably connected to an electrical circuit, wherein the electrical circuit includes means for closing the electrical circuit in operable connection with the rotation of the fishing line spool and means for signaling a fish strike to a user.

10 Claims, 5 Drawing Sheets

FISH STRIKE INDICATORS

FIELD OF THE INVENTION

The embodiments herein relate to fishing reels having means for detecting and signaling a fish striking the fishing line.

BACKGROUND

Noisy or darkened conditions can oftentimes make it difficult for a user to determine whether a fish has struck his fishing line. Likewise, even during quiet, daytime conditions, a fisherman does not always want to be watching over his line. Attempts to create fish strike indicators are known in the prior art. In their simplest forms, bells, or other noise makers, are attached directly to the fishing rod or line. Other simple indicators are glow sticks, flags, glow bobbers, and other visual indicators attached directly to the fishing rod or line. Unfortunately, in addition to signaling a fish strike, these indicators are falsely triggered by many other causes, including the wind and strong water currents. Many of these prior devices are also disadvantaged in that they have to be removed by the fisherman before the hook is set, otherwise the bells or noisemakers will continue to make noise as the fish is reeled in.

Another indicator, as described in U.S. Pat. No. 5,570,532, to Shaffer et al. requires an indicator to be in a housing separate from the reel itself, thus making an awkward indicator, having many parts, such as a spring retainer and a plunger. Accordingly, there is a need in the art to provide a reliable and easy to use fish strike indicator that can be used with live bait, and is housed entirely within the reel itself. Additionally, an object of this invention is for the user to be able to turn the indicator ON and OFF, so that the device is not emitting a signal while the fish is reeled in or the line is being cast.

SUMMARY OF THE INVENTION

Preferred embodiments relate to a fish strike indicator including a fishing reel having a rotatable fishing line spool and housing a power source operably connected to an electrical circuit, wherein the electrical circuit includes means for closing the electrical circuit in operable connection with the rotation of the fishing line spool, and means for signaling a fish strike to a user.

Further embodiments include means for closing the electrical circuit such as two contacts operably coupled to a partly metal underside of an actuator gear configured to rotate as the fishing line spool rotates. Other means for closing the electrical circuit include a micro limit switch having a lever arm roller operably coupled to a cam configured to rotate as the fishing line spool rotates, such that the micro limit switch closes the electrical circuit and provides power to activate the means for signaling a fish strike to a user. In more specific embodiments, the cam can be a flat cam having an indentation configured to maintain said level arm roller in a downward position.

In more specific embodiments, the teachings herein are directed to fish strike indicators housed entirely inside of a fishing reel and having an externally accessible ON/OFF switch operably connected to an electrical circuit and configured to prevent or allow power transfer to the means for signaling a fish strike to a user. In other embodiments, the power source is a lithium battery.

In more specific embodiments the fish strike indicators described herein include audible and/or visual means for signaling a fish strike to a user, such a buzzer or a light emitting diode (LED), for example.

BRIEF DESCRIPTION OF THE DRAWINGS

It will be appreciated that the drawings are not necessarily to scale, with emphasis instead being placed on illustrating the various aspects and features of embodiments of the invention, in which.

DETAILED DESCRIPTION OF THE ILLUSTRATED EMBODIMENTS

Embodiments of the present invention are described below. It is, however, expressly noted that the present invention is not limited to these embodiments, but rather the intention is that modifications that are apparent to the person skilled in the art and equivalents thereof are also included.

In preferred embodiments, the fish strike indicators described herein are housed entirely inside a fishing reel. While in more preferred embodiments, the strike indicators described herein are housed in a baitcasting reel, they can also be housed in any open-face spinning, or closed-face spinning fishing reel.

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention.

Figure 1:
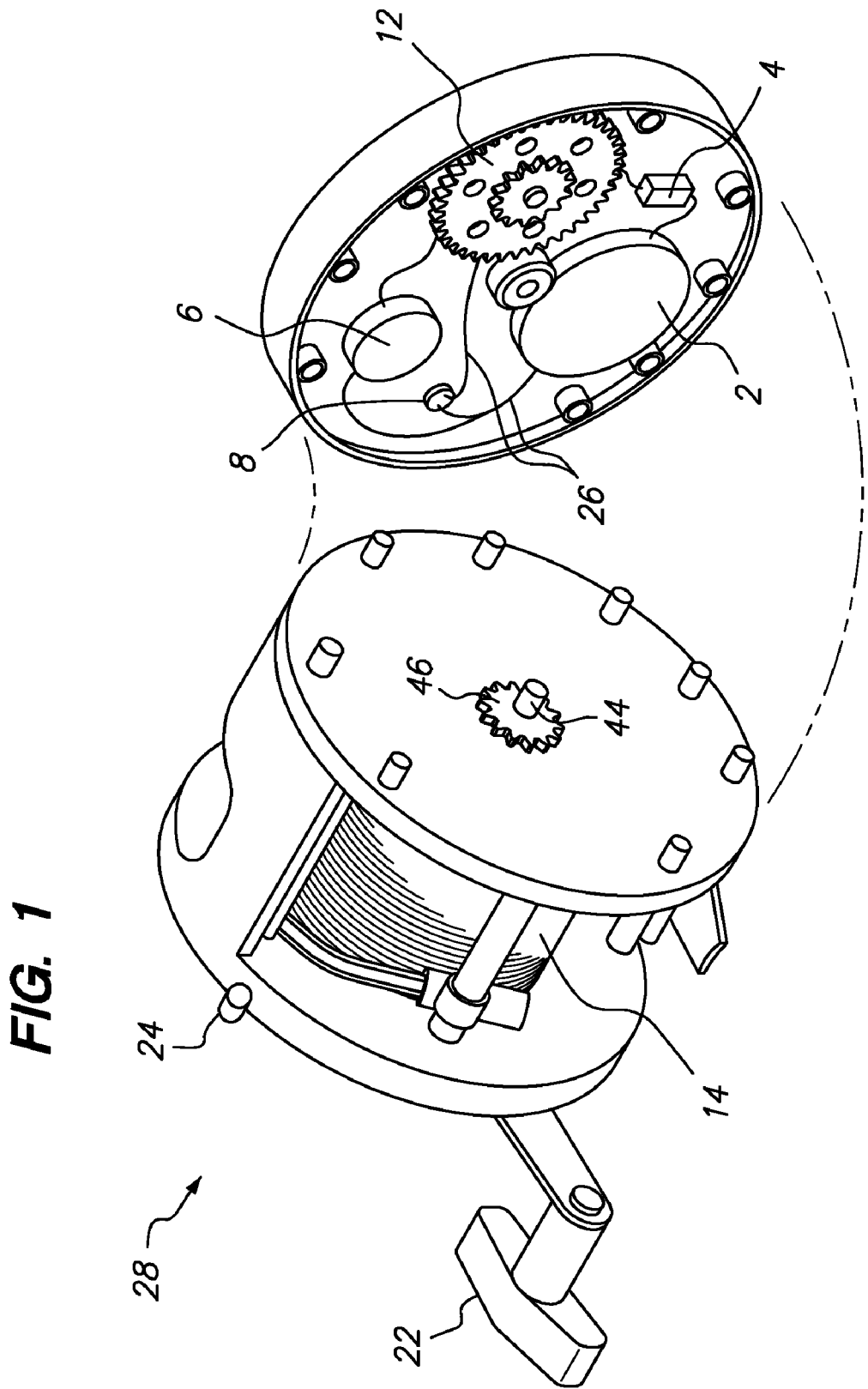
FIG. 1 is an exploded view of one embodiment of a fish strike indicator housed inside of a baitcasting reel.
Figure 2:
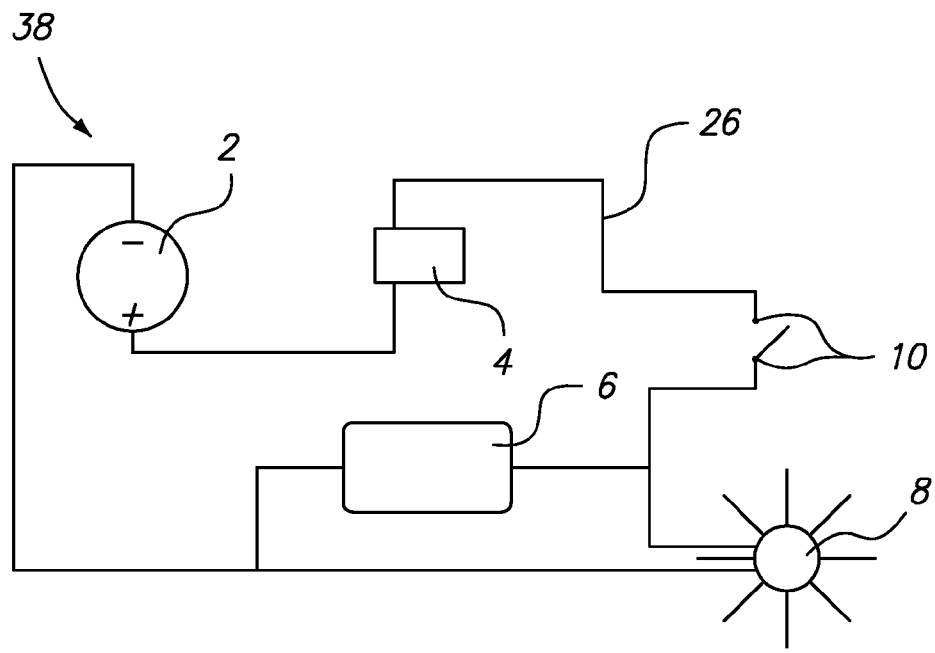
FIG. 2 is schematic view of an electrical circuit used to indicate a fish strike to a user.

FIG. 1 depicts an exploded view of a baitcasting reel 28 having a handle 22 and a rotatable spool 14 for wrapping fishing line around. The side of the reel opposite the handle 22 (the left side for right-handed reels and the right side for left-handed reels) houses an electrical circuit 38 that includes a power source 2 electrically connected by wires 26 to an ON/OFF switch 4 and a buzzer 6 and LED 8 to be used as audible and visual signaling devices respectively. (See also FIGS. 2 and 3 for more views of the electrical circuit 38 housed within the fishing reel)

In general, and as will be described in more detail herein, an open electrical circuit 38 can be configured to be closed when a fish strikes the fishing line. When the electrical circuit 38 is closed, the power source 2 is capable of sending power through connective wires 26 to activate both the buzzer 6 and the LED 8. In preferred embodiments, an ON/OFF switch 4 connected to the electrical circuit 38 allows a user to control the power transfer to the signaling devices (e.g., buzzer 6 and LED 8). When the ON/OFF 4 switch is turned off, power will not be transferred to the buzzer 6 or the LED 8 regardless of whether the circuit 38 is closed or open. Similarly, when the circuit 38 is open, no power will be transferred to the signaling devices (e.g., buzzer 6 and LED 8) regardless of whether the ON/OFF switch 4 is turned on or off.

In preferred embodiments, the electrical circuit 38 includes means for closing the electrical circuit that are in operable connection with the rotation of the fishing line spool 14. In more specific embodiments, a fish striking the fishing line from a baitcasting reel will cause the spool 14 to rotate, thereby closing the electrical circuit 38.

Figure 3:
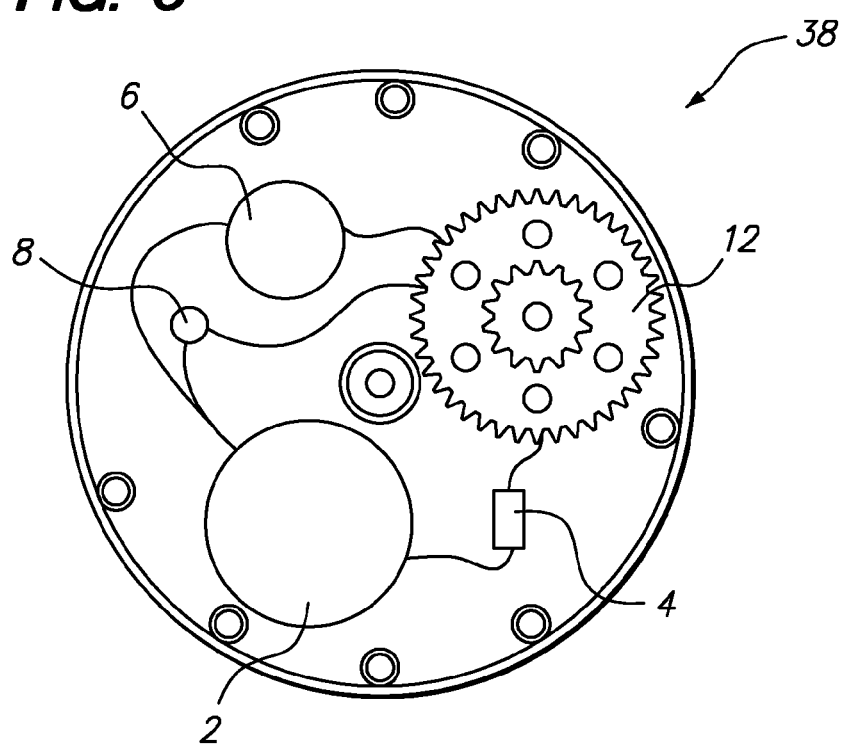
FIG. 3 is a view of the internal workings of one embodiment of a fish strike indicator.

Various means are contemplated for closing the electrical circuit and are in operable connection with the rotation of the fishing line spool 14. FIGS. 1 and 3 depict one advantageous way to close a circuit by utilizing an actuator gear 12 housed inside the fishing reel. In advantageous embodiments, the actuator gear 12 is in operable connection with the rotatable spool 14. With respect to these embodiments, the term "operable connection" relates to multiple configurations that allow the actuator gear 12 to rotate as the spool 14 rotates. According to one embodiment, the teeth of the actuator gear 12 are directly in contact with the spool's 14 axial shaft 44 (not shown). In more specific aspects, the axial shaft 44 of the spool 14 can include a worm gear having teeth that are compatible with the teeth of the actuator gear 12 (not shown).

In other embodiments, the teeth of the actuator gear 12 works directly in conjunction with a gear 46 that is directly connected to the spool's 14 axial shaft 44. In still other embodiments, the actuator gear 12 is connected by a series of two or more gears (e.g., 2, 3, 4, or 5 gears) to the axial shaft 44 of the rotating spool 14.

In certain embodiments, the actuator gear 12 is a flat spur gear having teeth projecting radially. More specifically, the gear's teeth can be cut so that the leading edges are parallel to the line of the axis of rotation. According to these embodiments, it is desirable that the axial shaft 44 of the spool 14 is parallel to the rotating axis of the spur type actuator gear 12. In other embodiments, the actuator gear can be a bevel gear (having straight or spiral teeth) or a helical gear, for example. Similarly, gears that can operably connect the actuator gear 12 to the spool's axial shaft 44 can non-exclusively be spur, bevel, or helical gears, for example. In other specific embodiments, the actuator gear 12 is a modified line leveling gear.

Figure 6:
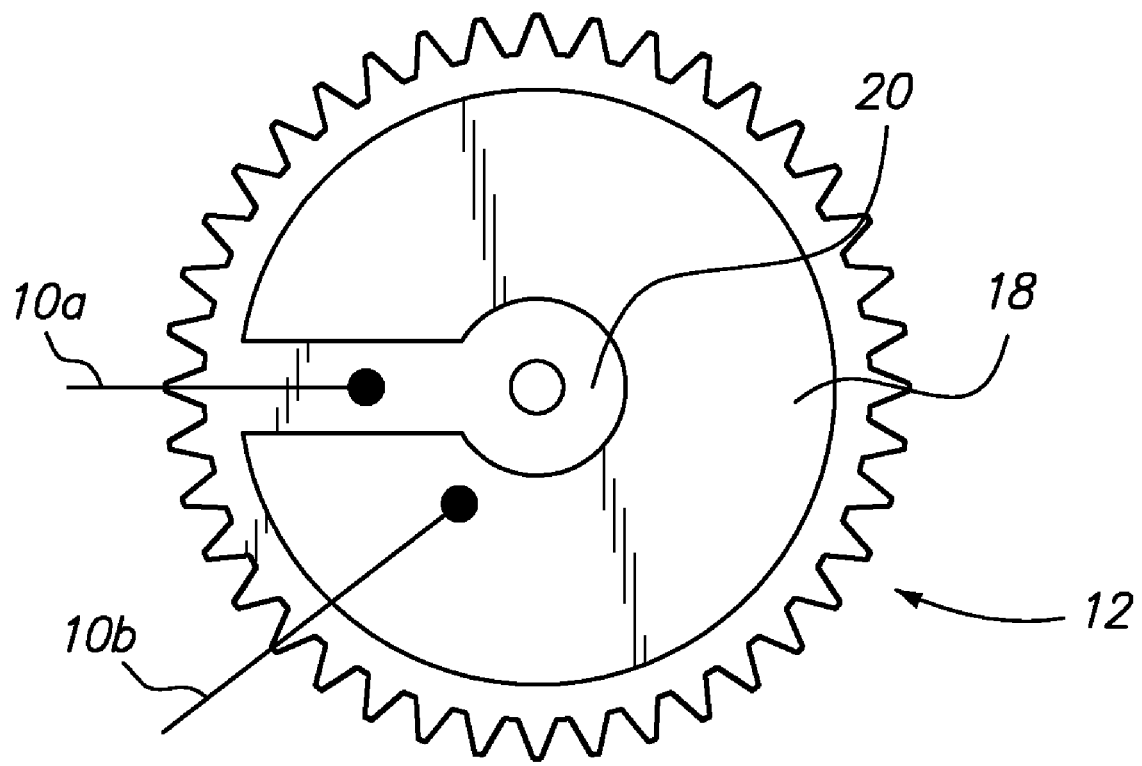
FIG. 6 is a backside view of a preferred embodiment of an actuator gear.

FIG. 6 depicts a preferred embodiment of an actuator gear's backside 12. While the gear can be primarily plastic, in this aspect, the backside of the gear is nearly entirely layered in conductive metal 18. In more specific embodiments, there is a strip of plastic exposed 20 on the backside of the actuator gear 12, where there is no metal. In even more specific embodiments, the electrical circuits 38 described herein include two contacts 10 that can be used to open and close the circuit 38. In a preferred aspect, a first contact 10a is in contact with the plastic strip 20 while the second contact 10b is in contact to the metal layer 18 on the backside of the actuator gear 12. In this position, the electrical circuit 38 is open, and no power can be transferred to the signaling devices (e.g., buzzer 6 or LED 8).

In preferred aspects of the teachings herein, a fish striking the line cause the fishing reel spool 14 to rotate as the line is taken out. The rotation of the spool 14 then causes the operably connected actuator gear 12 to rotate. As the actuator gear 12 rotates, both contacts 10 come into contact with the metal layer 18 of the backside of the actuator gear 12 and close the electrical circuit 38, thereby allowing the power source 2 to activate the buzzer 6 and the LED 8.

In other preferred embodiments, especially when the user is ready to fish again, a user can use the handle 22 of the reel to rotate the spool 14 and thereby the actuator gear 12 from a closed circuit position, where both contacts 10 are in contact with the metal layer 18, to an idle position such that the first contact 10a is no longer touching the metal layer 18 of the actuator gear. More specifically, the user can utilize the reel handle 22 to rotate the actuator gear 12 so that the first contact 10a is in contact with the exposed plastic strip 20, thereby opening the electrical circuit 38 and cutting off power to the signaling devices (e.g., buzzer 6 and LED 8).

In addition to using an actuator gear 12, further means in operable connection with the rotation of the fishing line spool 14 are contemplated for closing the electrical circuit 38. FIGS. 4a, 4b, 5a, and 5b depict preferred embodiments, where a small or micro limit switch 30 is coupled to a rotating cam 32 (see FIGS. 5a and 5b) or rotating flat cam 36 (see FIGS. 4a and 4b) in operable connection with the rotatable spool 14. In preferred aspects, the limit switch 30 is an electro-mechanical device that includes a lever arm roller 34 as an actuator to mechanically link to a set of contacts 10. When an object pushes the lever arm roller 34 upwards, the contacts 10 become linked and close the electrical circuit 38. Similarly when the lever arm roller 34 is allowed to drop down, the contacts 10 unlink and open the circuit. The use of a limit switch 30 is an advantageous embodiment for the teachings herein as it allows ease of installation and reliability of operation.

The term "operable connection" as used in these embodiments relates to multiple configurations that allow the cam 32 or flat cam 36 to rotate as the spool 14 rotates. In specific embodiments, the cam 32 or flat cam 36 can rotate directly around the spools's axial shaft 44. In other embodiments, the cam 32 or flat cam 36 can be configured to work in operation with 1 or more gears (e.g., 1, 2, 3, 4, or 5 gears) such that it rotates as the spool's shaft rotates 44.

Figure 5A:
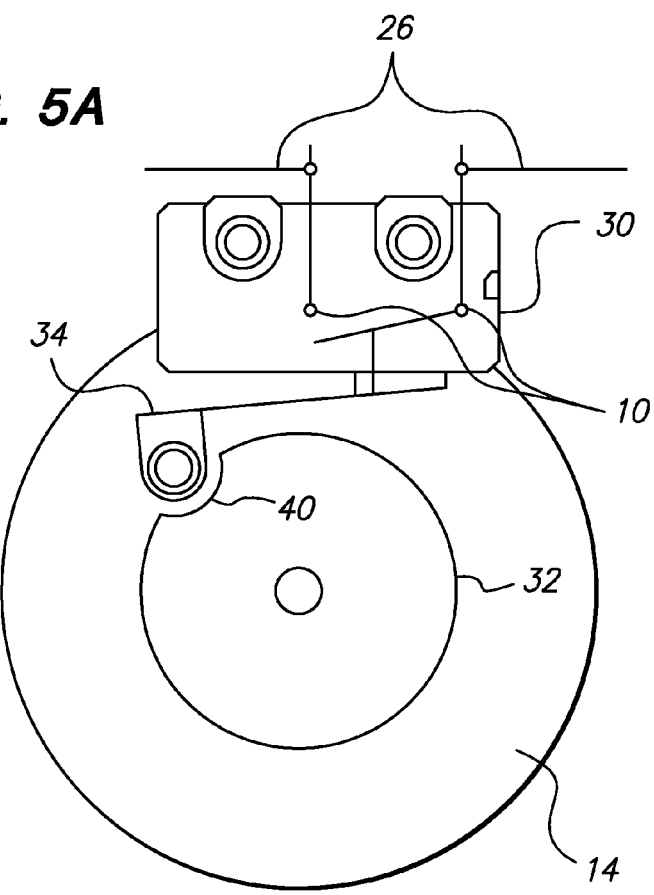
FIG. 5a depicts an open circuit embodiment of a fish strike indicator that includes a micro limit switch in operable connection with a cam to actuate signaling.
Figure 5B:
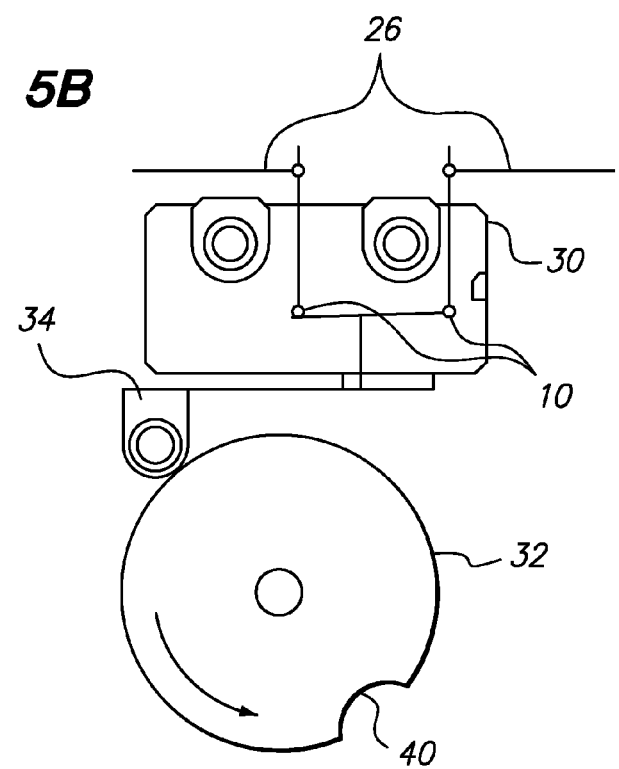
FIG. 5b depicts a closed circuit embodiment of a fish strike indicator that includes a micro limit switch in operable connection with a cam to actuate signaling.

In advantageous embodiments, the cam 32 has a small groove 40 configured to hold the lever arm roller 34. As FIG. 5a illustrates, in even more preferred embodiments, the means for closing the electrical circuit 38 are configured such that when the lever arm roller 34 is situated in the cam's groove 40, the contacts 10 are not linked, the electrical circuit 38 is in an open position, and no power is transferred to the means for signaling a fish strike to a user (e.g., buzzer 6 and LED 8). As FIG. 5b depicts, in further aspects, as the cam 32 rotates, the lever arm roller 34 is displaced from the groove 40, thereby linking the contacts 10 within the limit switch 30 and closing the electrical circuit 38. The continued rotation of the cam 32 (caused by the rotating spool 14) maintains the level arm roller 34 on the outer-circumference of the cam 32, and out of the groove 40, thereby maintaining a closed electrical circuit 38. As described previously, the closed electrical circuit 38 permits electrical power to be transferred from the power source 2 to the signaling means (e.g., buzzer 6 and LED 8).

Figure 4A:
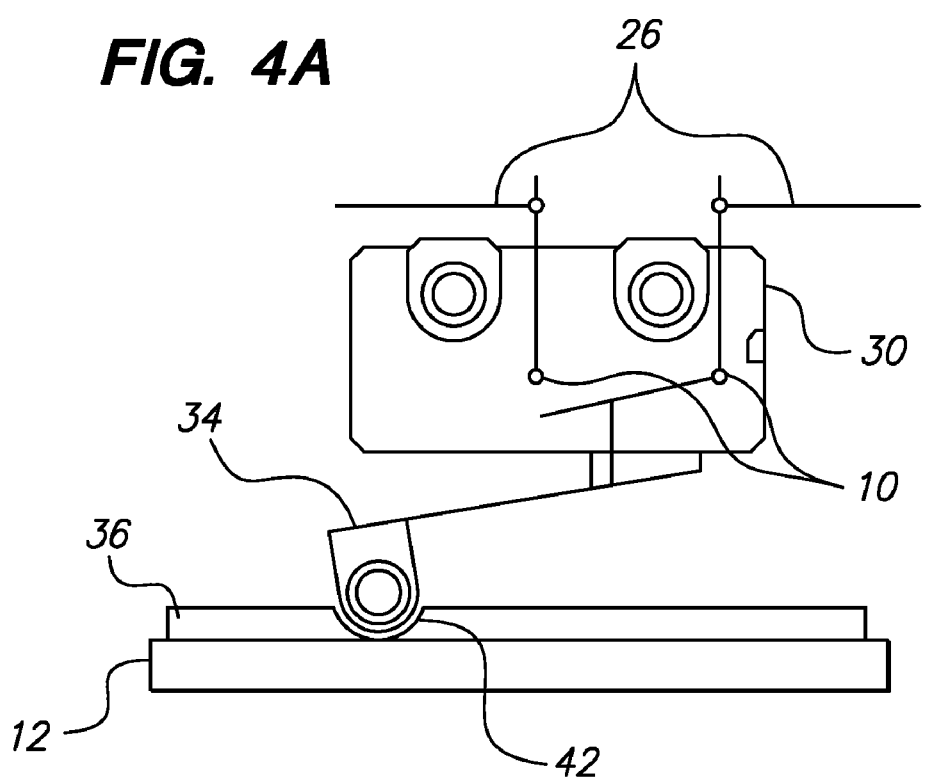
FIG. 4a depicts an open circuit embodiment of a fish strike indicator that includes a micro limit switch in operable connection with a flat cam to actuate signaling.
Figure 4B:
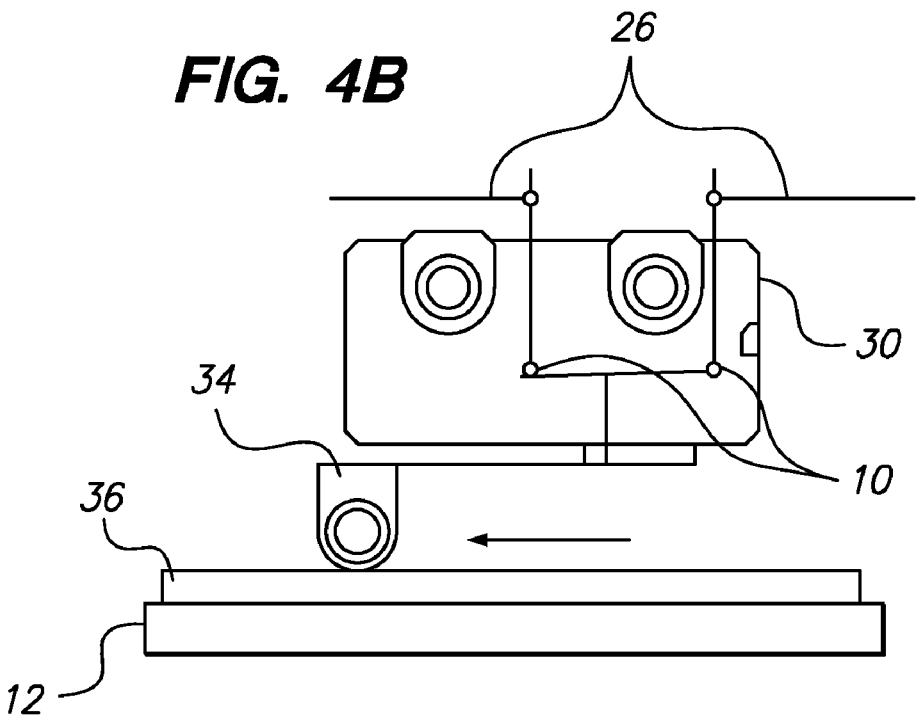
FIG. 4b depicts a closed circuit embodiment of a fish strike indicator that includes a micro limit switch in operable connection with a flat cam to actuate signaling.

In similarly advantageous embodiments, a rotatable flat cam 36 having a small indentation 42 configured to maintain the lever arm roller 34 in a downward position can be used with a limit switch 30 to open and close the electrical circuit 38. As FIG. 4a illustrates, in even more preferred embodiments, the means for closing the electrical circuit 38 are configured such that when the lever arm roller 34 is situated in the flat cam's indentation 42, the contacts 10 are not linked, the electrical circuit 38 is open, and no power is transferred to the means for signaling a fish strike to a user (e.g., buzzer 6 and LED 8). As shown in FIG. 4*b*, as the flat cam 36 rotates, the lever arm roller 34 is displaced from the indentation 42, thereby linking the contacts 10 within the limit switch 30 and closing the electrical circuit 38. The continued rotation of the flat cam 36 (resulting from the rotating spool 14) maintains the level arm roller 34 on the outer surface of the cam 36 and out of the indentation 42, thereby maintaining a closed electrical circuit 38. As described previously, the closed electrical circuit 38 permits electrical power to be transferred from the power source 2 to the signaling means (e.g., buzzer 6 and LED 8).

In other preferred embodiments, especially when the user is ready to fish again, a user can use the handle 22 of the reel to rotate the spool 14 and thereby the cam 32, or the flat cam 36, from a closed circuit position, where the lever arm roller 34 is in an upward position, to an idle position such that the lever arm roller 34 is in a downward position. More specifically, the user can utilize the reel handle 22 to rotate the cam 32 so that lever arm roller 34 is in the groove 40 of the cam 32. Similarly, the user can utilize the reel handle 22 to rotate the flat cam 36 so that lever arm roller 34 is in the indentation 42 of the flat cam 36. When the lever arm roller 34 is in the downward position, the electrical circuit 38 is opened, thereby cutting off the power to the signaling devices (e.g., buzzer 6 and LED 8).

In advantageous aspects, a small portable power source 2 can be used to provide power to the strike indicators described herein. In specific embodiments, the power source is one or more batteries such as a AA, or AAA alkaline battery. In more preferred embodiments the power source for signaling a fish strike to a user are one or more lithium batteries. In advantageous embodiments, one 6 V lithium battery, or two 3 V lithium batteries are used to power the strike indicators described herein. Those with skill in the art can readily select an appropriate power source 2 that is compatible with the power requirements of the selected means for signaling a fish strike (e.g., buzzer 6, LED 8).

In further aspects, the fishing reels described herein have an externally accessible ON/OFF switch 4 operably connected to the power source 2. These embodiments allow the user to turn off the means for signaling a fish strike (e.g, buzzer 6, LED 8) when casting the fishing line, letting out the fishing line, or when reeling in the fishing line. In advantageous aspects, the ON/OFF switch 4 permits the user to allow power flow from the power source 2 when they are ready to catch fish.

In preferred aspects, a fishing reel houses means for signaling a fish strike operably coupled to the power source. In certain embodiments, the means for signaling a fish strike to a user can be an audible signal, including a buzzer or chime, for example. In preferred embodiments, the buzzer is a 6 Volt "Mini Buzzer" from Radio Shack (part no. 273-054). In embodiments where an audible signal is used, it is preferred that a speaker is exposed to the outside of the fishing reel, so that users can more readily hear the signal. In preferred embodiments, a user can hear the audible signal from at least 10 yards, 20 yards, 30 yards, 40 yards, 50 yards, and 60 yards away.

In further aspects, the means for signaling a fish strike to a user can be a visual signal such as a light, or more particularly a light emitting diode (LED), for example. In embodiments where a light is used, it is preferred that the lens of the light is exposed to the outside of the fishing reel, so that users can more readily see the signal. In more specific embodiments the LED can be any available color such as red, orange, amber, yellow, green, blue or white. In other embodiments, a bi-color LED can be used to signal a fish strike. Bi-color LEDs typically have two LEDs wired in 'inverse parallel' (one forwards, one backwards) combined in one package with two leads. In still other aspects, tri-color LEDs can be used to signal a fish strike. In preferred embodiments, a user can see the visual signal from at least 10 yards, 20 yards, 30 yards, 40 yards, 50 yards, and 60 yards away.

In still other aspects, the means for signaling a fish strike can be a vibrating device or a transducer. In more preferred embodiments, the means for signaling a fish strike to a user include both an audible and visual signal, such as a buzzer and an LED together, for example. In still other embodiments, the means for signaling a fish strike can be only an audible signal without a visual signal, or a visual signal without an audible signal.

In further advantageous embodiments, the strike indicators described herein can be used on fishing line with any type of available tackle and bait. Specific examples of tackle that can be used with the teachings herein nonexclusively include floats such as round bobbers, pencil style bobbers, and slip bobbers. Other tackle that can be used with the teachings herein include sinkers such as weights and irons.

In more specific aspects, the fish strike indicators can be used with live bait, artificial bait, or with a lure. A non-exclusive list of lures that can be used with the teachings herein include, jigs, spoons, soft plastic bait, and spinners, for example. In additional embodiments, the fish strike indicators described herein can be used for bottom fishing, trolling and casting.

In further embodiments, the strike indicators described herein can be used with any available fishing line. A non-exclusive list of fishing line the strike indicators can be used with include monofilament (e.g., nylon), co-filament, fused lines, fluorocarbons, and braided line. In preferred aspects, the strike indicators described herein can be used with any poundage of fishing line. A non-exclusive list of fishing line poundage that can be used with the teachings herein include 1 lb., 2 lb., 4 lb., 6 lb., 8 lb., 10 lb., 12 lb., 14 lb., 16 lb., 18 lb., 20 lb., 30 lb., 40 lb., 50 lb., 60 lb., 70 lb., 80 lb., 90 lb., 100 lb., 150 lb., 200 lb., 250 lb., and 300 lb., or less, for example.

In preferred embodiments, such as when live bait is being used, it is preferred that an external adjustable drag control 24 is operably coupled to the rotatable spool 14 of fishing line. In preferred aspects, the external adjustable drag control 24 allows a user to either increase or decrease the friction applied to the rotating spool, thereby making it harder or easier for the spool to rotate. In advantageous aspects, the drag can be set such that the live bait does not take out the line and trigger a false signal. Any available drag control mechanism available can be used with the teachings described herein. Examples of various drag control mechanisms that can be used with the strike indicators disclosed herein (to the degree they are not inconsistent with) are discussed in U.S. Pat. No. 4,142,694, to Rankin. This reference is hereby expressly incorporated by reference in its entirety.

As fishing is an activity conducted around water, whether salt or fresh water, in preferred embodiments the reels described herein are sealed to prevent water from entering and damaging the electrical circuitry housed within the reel.

Any available sealant can be used to seal the connecting parts, joints, or other openings in the fishing reels described herein.

While the teachings herein have been primarily focused on strike indicators as used with baitcasting reels, the fish strike signaling assemblies described herein can also readily be incorporated into spinning reels too (e.g., closed-face and opened-face). All means for closing an electrical circuit that have been described herein (e.g., actuator gear, limit switch, cam, and flat cam) for use with baitcasting reels can also be readily configured to work with a a spinning reel, through the use of 1 or more gears (e.g., 1, 2, 3, 4, and 5 gears), for example. In preferred embodiments, the fish strike indicators described herein can be entirely housed inside a spinning reel.

The invention may be embodied in other specific forms besides and beyond those described herein. The foregoing embodiments are therefore to be considered in all respects illustrative rather than limiting, and the scope of the invention is defined and limited only by the appended claims and their equivalents, rather than by the foregoing description.

What is claimed is:

1. A fish strike indicator comprising:
   a fishing reel having a rotatable fishing line spool and housing:
   a power source operably connected to an electrical circuit, wherein the electrical circuit comprises:
   means for closing the electrical circuit in operable connection with the rotation of the fishing line spool;
   means for signaling a fish strike to a user; and an externally accessible ON/OFF switch operably connected to said electrical circuit and configured to prevent or allow power transfer to the means for signaling a fish stike to a user.

2. The fish strike indicator of claim 1, wherein said fishing reel further comprises an external adjustable drag control operably coupled to said fishing line spool.

3. The fish strike indicator of claim 1, wherein said means for signaling a fish strike is audible to a user.

4. The fish strike indicator of claim 3, wherein said audible means comprise a buzzer.

5. The fish strike indicator of claim 1, wherein said means for signaling a fish strike is visible to a user.

6. The fish strike indicator of claim 5, wherein said visible means comprise alight emitting diode (LED).

7. The fish strike indicator of claim 1, wherein said power source is a lithium battery.

8. A fish strike indicator comprising:
   a fishing reel having a rotatable fishing line spool and housing:
   a power source operably connected to an electrical circuit, wherein the electrical circuit comprises:
   two contacts for closing the electrical circuit operably coupled to a partly metal underside of an actuator gear configured to rotate as the fishing line spool rotates;
   and means for signaling a fish strike to a user.

9. A fish strike indicator comprising:
   a fishing reel having a rotatable fishing line spool and housing:
   a power source operably connected to an electrical circuit, wherein the electrical circuit comprises:
   a micro limit switch having a lever arm roller operably coupled to a cam configured to rotate as the fishing line spool rotates, such that the micro limit switch closes the electrical circuit;
   and means for signaling a fish strike to a user.

10. The fish strike indicator of claim 9, wherein said cam is a flat cam having an indentation configured to maintain said level arm roller in a downward position.

* * * * *